United States Patent [19]

Conselvan et al.

[11] Patent Number: 5,190,772

[45] Date of Patent: Mar. 2, 1993

[54] DEVICE TO CHANGE DIES

[75] Inventors: Pierluigi Conselvan, Selvazzano; Attilio Cecchin, S. Martino di Lupari, both of Italy

[73] Assignee: Pavan Mapimpianti S.p.A., Galliera Veneta, Italy

[21] Appl. No.: 849,356

[22] Filed: Mar. 11, 1992

[30] Foreign Application Priority Data

Mar. 20, 1991 [IT] Italy .................. UD91A000042

[51] Int. Cl.[5] ................................ A01J 21/00
[52] U.S. Cl. ...................... 425/184; 415/192 R; 415/461
[58] Field of Search .............. 425/190, 191, 192, 463, 425/376.1, 183, 184, 185, 461

[56] References Cited

FOREIGN PATENT DOCUMENTS

| 0203771 | 5/1986 | European Pat. Off. |
|---|---|---|
| 0369195 | 10/1989 | European Pat. Off. |
| 297803 | 7/1915 | Fed. Rep. of Germany ...... 425/184 |
| 3029767A1 | 5/1982 | Fed. Rep. of Germany. |
| 3243184A1 | 5/1984 | Fed. Rep. of Germany. |
| 3819088A1 | 12/1989 | Fed. Rep. of Germany. |

Primary Examiner—Bernard Nozick
Attorney, Agent, or Firm—Nixon & Vanderhye

[57] ABSTRACT

Device to change dies which is suitable for dies employed for the extrusion of dough as alimentary paste, generally called "pasta", whether long pasta in strings, pasta in strips or sheets, bird's nest-type pasta, etc., the device including a fresh die (12) and a used die (11) and having a central lengthwise axis (23) defining in a plane orthogonal to that axis (23) the first and third quarters of a circle, in which quarters the dies (11-12) are positioned within specific spaces (14-15), such spaces (14-15) being defined by an outer frame (19) and an inner frame (21), at least one of these frames (19-21) being able to move laterally so as to clamp or free the dies (11-12), the device being able to rotate about the central axis (23).

8 Claims, 4 Drawing Sheets

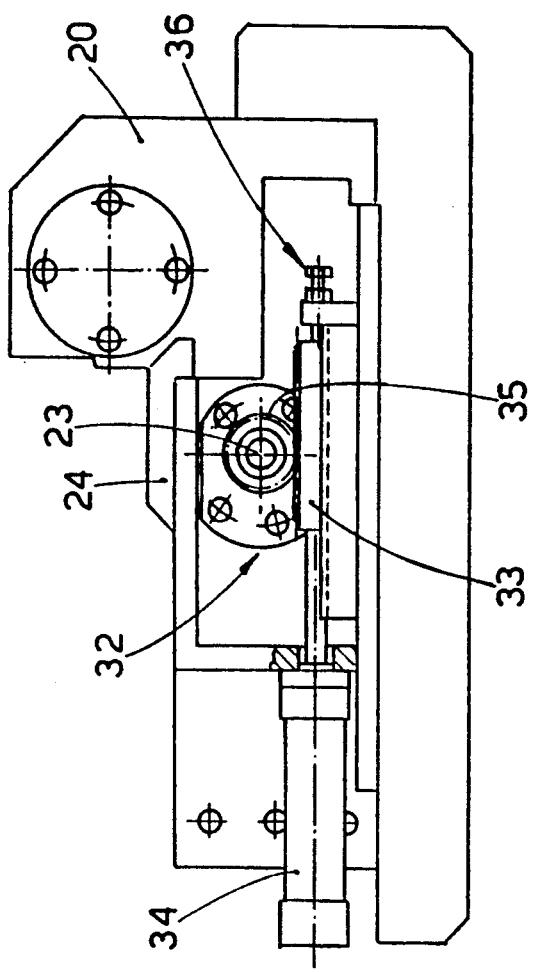
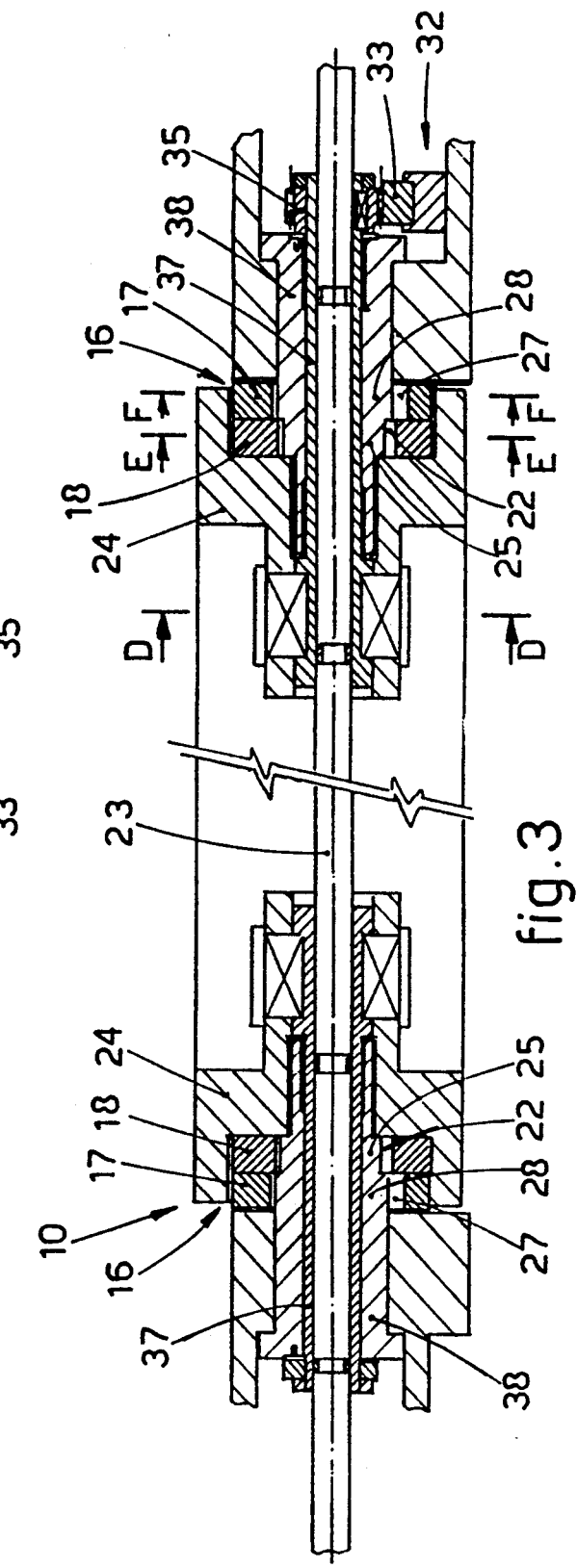

DEVICE TO CHANGE DIES

This invention concerns a device for the speedy changing of dies, as set forth in the main claim.

In particular the device according to the invention enables the dies to be changed speedily in plants for the extrusion of dough as alimentary paste, generally called "pasta", whether long pasta in strings, pasta in strips or sheets, bird's nest-type pasta, etc.

The device according to the invention is applied to the foodstuffs industry and, more particularly, to the technologies of conversion of cereals or other alternative raw foodstuffs materials.

Many types of pasta, such as pasta in long strings or ribbons, pasta in strips or sheets or bird's nest-type pasta for instance, are normally produced by extrusion through dies, which generally have a rectangular shape and include holes in a plurality of rows, the holes having sections suitable to obtain the product required.

The industrial machines producing pasta normally work with a continuous cycle, but the modern requirements of making various shapes or else the need to maintain the dies render necessary the frequent changing of the dies themselves.

The method most widely used nowadays for removal of the dies consists in thrusting the die lengthwise out of its seating by means of suitable actuators or mechanical systems suited to the purpose.

The die is thrust lengthwise so that the very great stresses generated in cutting the layer of product located between the extrusion head and the die do not impart deflections to the die.

The extrusion press which delivers the product to the die has to be halted for the whole time taken up in removing the die and replacing it.

This situation entails a loss of output and therefore an inadequate economical employment of the machine which produces the pasta and which includes a drier downstream of the extrusion system.

As is known, the pasta to be dried moves at a constant speed along the whole drier and stays therein for a preset time.

This stay time within the drier should not be varied since otherwise unacceptable alterations take place in the product; the conveyor system within the drier can therefore not be halted.

The stoppage of the extrusion press generates a lack of product in the conveyor system within the drier. This lack of product within the drier creates an alteration of the flows of air, with resulting variations of climatic conditions that entail changes in product quality as between the trailing end of the previous batch and the leading end of the next batch.

These changes in product quality are not acceptable and the product has therefore to be rejected. These rejects make greater the financial loss incurred in the prolonged downtime in production due to replacement of the die.

Yet another drawback consists in the fact that the replacement of the die takes place sideways or frontally to the machine and takes up a great deal of space, thus creating great problems of overall dimensions.

In the state of the art time is required to carry out a travel for removal of a die in one direction and a further travel to introduce a die in the opposite direction, and a further time is required to remove the used die and fit the fresh die.

The state of the art includes also solutions for limiting the times employed in changing the dies. For instance, the fresh die is introduced in such a way that it thrusts the used die out lengthwise, thus eliminating the waiting time required for removal of the used die.

In this case the overall bulk of the machine is further extended by the fact that space is needed for the fresh die to be inserted on one side and the used die to be removed on the other side.

Another solution employed consists in thrusting the die out with a movement substantially at a right angle to the axis of the die itself. This enables the used die to be removed with shorter travels and in less times than is the case with lengthwise removal.

But in this type of employed solution there is a drawback due to the fact that, as the used die has to emerge towards the machine operator, the insertion of the fresh die can only take place after the used die has been removed, and this solution is impaired owing to the working times needed for carrying out the exchange.

If it were desired to carry out this operation with one single movement by thrusting the used die out by means of the fresh die, then the latter would have to be positioned on the side opposite to the machine operator, namely below the extruder and therefore in a position hardly accessible for insertion of the die handling means.

The present applicants have therefore designed, tested and embodied this invention so as to obviate the shortcomings of the state of the art and to achieve further advantages.

The purpose of this invention is to provide a device which enables the used die in the extrusion head to be removed speedily so that the die can be cleaned, or merely to be replaced by another die being positioned for work.

Such device for the speedy change of dies cooperates advantageously with removal means substantially orthogonal to the lengthwise axis of the die but can be fitted generally also to means performing lengthwise removal of the die or to means using a combined removal system.

The device according to this invention makes possible a great reduction of the times required for replacing the die and therefore a great reduction of the downtime of the extrusion press.

In this way it is possible to achieve a better economical employment of the machine and a great reduction of the rejected material coming from the drier, this rejected material being directly in proportion to the downtime of the extrusion press.

The device for the speedy change of dies according to the invention comprises a die-holder table containing two spaces in which are located the used die to be changed and the fresh die.

This die-holder table can be rotated about an axis parallel to the lengthwise axes of the dies and passing between the two dies.

This die-holder table, when rotated by about 180° about such axis, exchanges the position of the used die with that of the fresh die.

With this device it is therefore necessary only to remove the used die, to position the fresh die on the table even during the removal time and to insert the fresh die into the extrusion head that holds the die.

While the fresh die is working, the used die can be replaced on the table without any problem.

The pivots about which the rotation takes place are located in a supporting structure capable advantageously of a traversing movement to remove the used die from the extrusion head and to introduce the fresh die.

The device according to this invention comprises clamping means having the task of clamping the dies suitably and preventing the dies falling during the inverting step.

According to a variant these clamping means enable the clamping of the used die to be released so that the used die can be readily removed.

The attached figures, which are given as a non-restrictive example, show some preferred embodiments of the invention as follows:

BRIEF DESCRIPTION OF THE DRAWINGS

FIG. 2 is a view according to the arrow A of FIG. 1;

FIG. 3 shows a lengthwise section according to B—B of FIG. 1;

Figure 1:
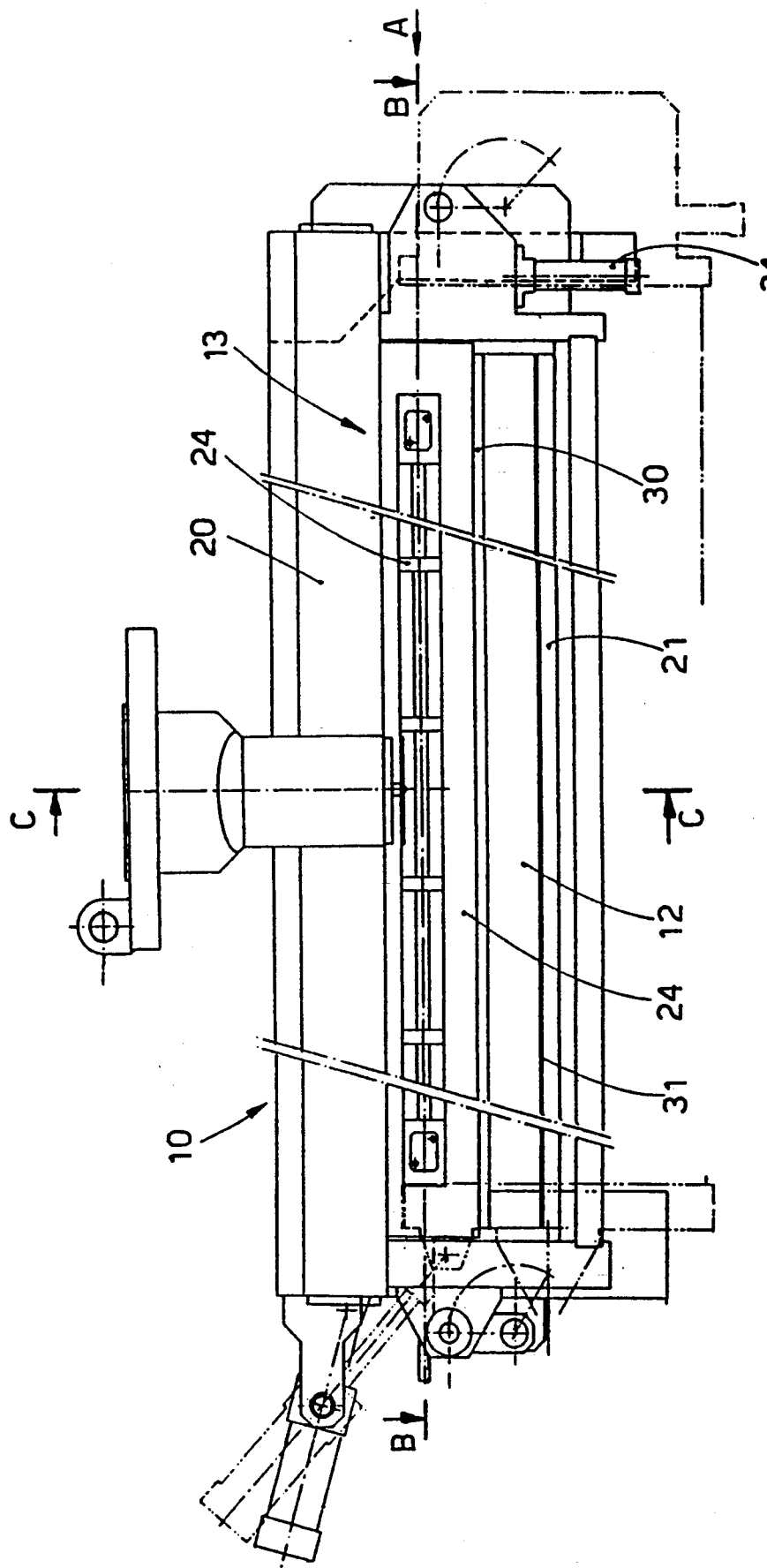
FIG. 1 shows a plan view of the extrusion head equipped with the die changing device according to this invention.

In the figures the reference number 10 generally denotes a device for the speedy change of dies according to the invention.

The die changing device 10 cooperates with an extrusion head 20 and comprises a die-holder table 13, which is divided, on a plane transverse to the lengthwise axis, into four sectors of which the first and third sectors are occupied, or in any event one sector is occupied while the next sector is not occupied and so on alternately.

These, sectors are defined by two orthogonal axes passing through a central lengthwise axis 23.

The die-holder table 13 comprises an outer frame 19 which can move laterally and can rotate about the central lengthwise axis 23.

An inner frame 21 is included within the outer frame 19 and cooperates therewith 19 and, together with the outer frame 19, defines spaces 14 and 15 holding two dies 11 and 12. One of these dies 11-12 is a fresh die, while the other die is a used die, or viceversa.

Clamping means 24 able to rotate about the central lengthwise axis 23 cooperate with the inner and outer frames 21-19 and are located substantially therewithin.

In this case the clamping means 24 include guides 16 within which there can slide terminal connection plates 17 and 18 respectively of the outer frame 19 and inner frame 21.

Figure 4A:
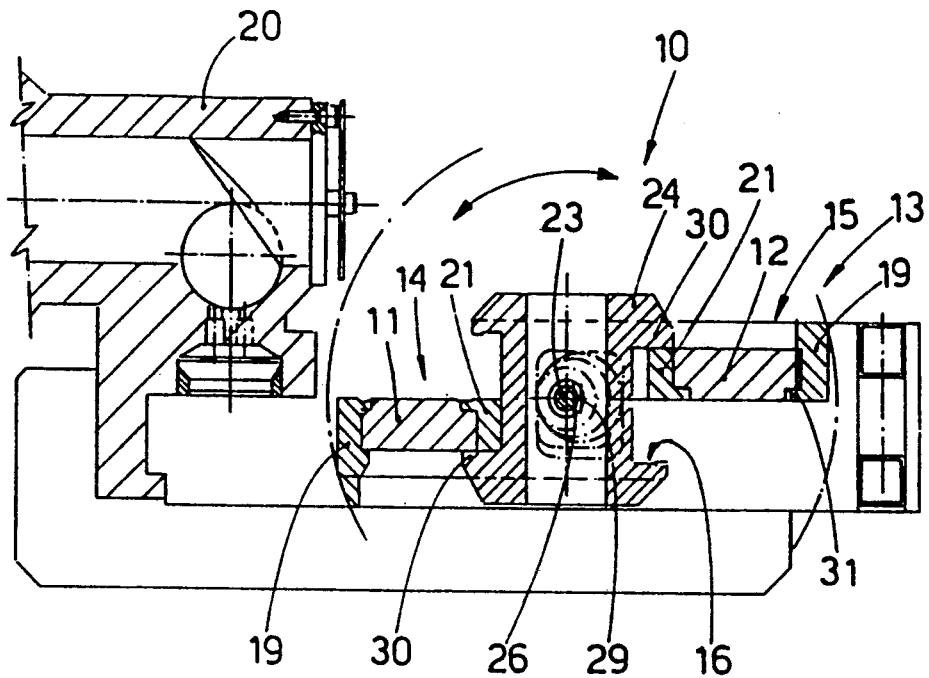
FIG. 4a shows a partial cross section according to C—C of FIG. 1.
Figure 4B:
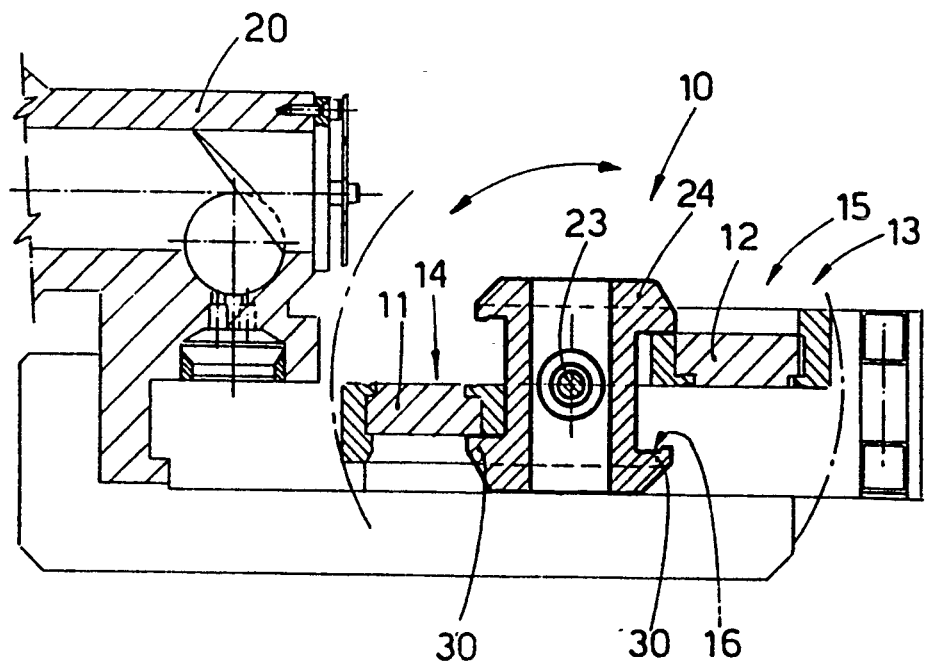
FIG. 4b shows a partial section according to D—D of FIG. 3.
Figure 4C:
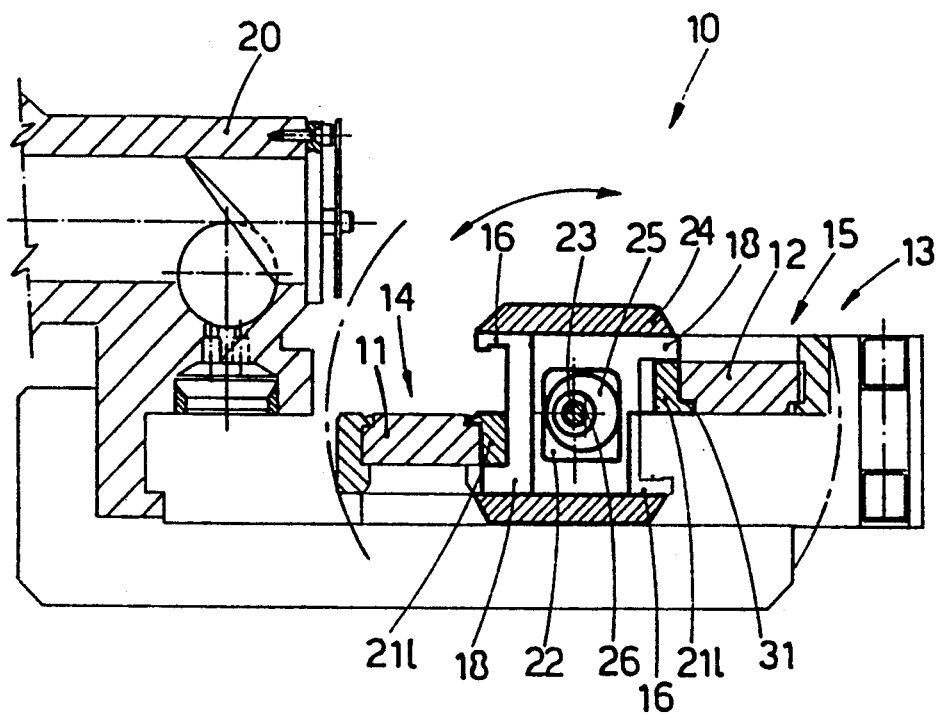
FIG. 4c shows a partial section according to E—E of FIG. 3.

Thus, the inner frame 21 (FIG. 4c) consists of two lengthwise bars 211 and the terminal connection plates 18.

The terminal connection plates 18 contain an aperture 22 within which is positioned a first eccentric 25 having an axis 26.

Figure 4D:
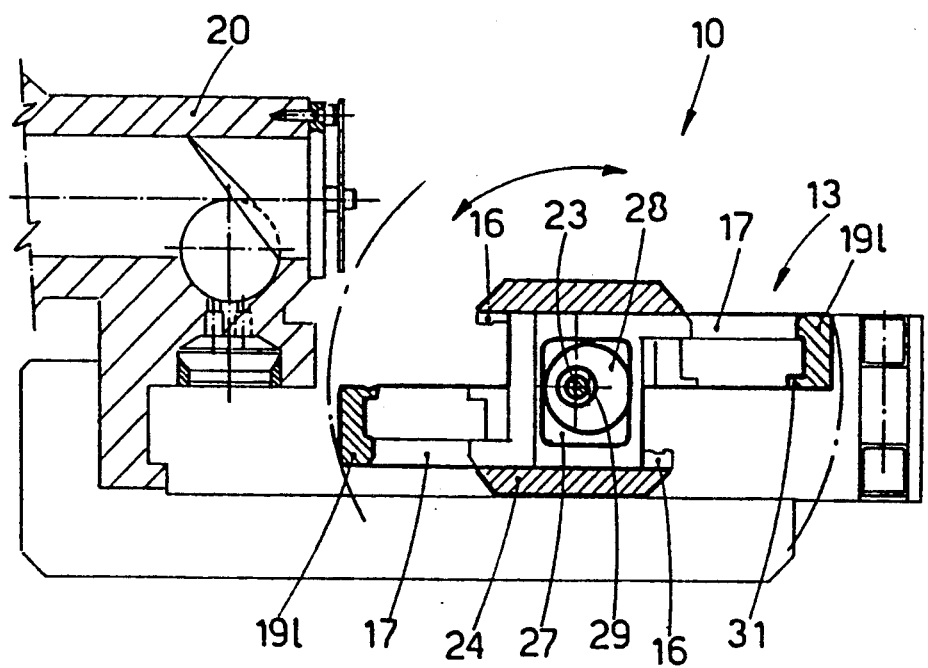
FIG. 4d shows a partial section according to F—F of FIG. 3.

The outer frame 19 (FIG. 4d) consists of two lengthwise bars 191 and the terminal connection plates 17.

The terminal connection plates 17 contain an aperture 27 within which is positioned a second eccentric 28 having an axis 29.

The clamping means 24 comprise teeth 30, which clamp the dies 11-12 momentarily and prevent them falling from their spaces 14-15.

The space 14 or 15 contains on the inner opposed lengthwise faces of the respective frame 19 or 21 support surfaces 31 to support the die 11 or 12 when the space 14 or 15 has been opened.

Sideways movement of the frames 19-21 in relation to the clamping means 24 is accomplished with an opening-closing system 32, which carries out the inverting action too.

In this case the opening-closing system 32 comprises a rack 33 driven axially by a piston-cylinder actuator 34. The rack 33 acts on a gearwheel 35 and comprises means 36 to regulate travel.

The gearwheel 35 is solidly fixed to an inner sleeve 37 firmly connected to the clamping means 24, which can therefore rotate on the lengthwise shaft 23.

When the gearwheel 35 is rotated, the assembly consisting of the clamping means 24 and frames 19-21 is rotated.

An outer sleeve 38 comprises the eccentrics 25 and 28 having their axes on 26 and 29 respectively.

The eccentrics 25-28 act on the apertures 22-27 respectively while rotation takes place, and cause the reciprocal displacement described above.

The clamping means 24 cooperate with the extrusion head 20 for the correct clamping of the die in use.

We claim:

1. Device to change dies which is suitable for dies employed for the extrusion of dough as alimentary paste, generally called "pasta", whether long pasta in strings, pasta in strips or sheets, bird's nest-type pasta, etc., the device including a fresh die (12) and a used die (11) and being characterized in that it has a central lengthwise axis (23) defining in a plane orthogonal to that axis (23) the first and third quarters of a circle, in which quarters the dies (11-12) are positioned within specific spaces (14-15), such spaces (14-15) being defined by an outer frame (19) and an inner frame (21), at least one of these frames (19-21) being able to move laterally so as to clamp or free the dies (11-12), the device being able to rotate about the central axis (23).

2. Device as claimed in claim 1, which comprises means (24) for the vertical clamping of the dies (11-12).

3. Device as claimed in claim 1 in which the clamping means (24) with a die (11-12) in use cooperate with an extrusion head (20).

4. Device as claimed in claim 1, in which the clamping means (24) include lateral guides (16) for the sliding of terminal plates (17) of the respective frames (19-21).

5. Device as claimed in claim 1, in which the outer frame (19) comprises lengthwise bars (191) and terminal plates (17) containing at least one aperture (27).

6. Device as claimed in claim 1, in which the inner frame (21) comprises lengthwise bars (211) and terminal plates (18) containing at least one aperture (22).

7. Device as claimed in claim 1, in which a stationary eccentric (25-28) cooperates with at least one of the apertures (22-27).

8. Device as claimed in claim 1, in which the lengthwise bars (191-211) comprise supporting means (31).

* * * * *